May 23, 1967  H. K. NAJARIAN  3,321,191
GAS AND LIQUID CONTACT APPARATUS
Original Filed July 7, 1961  7 Sheets-Sheet 7

INVENTOR
HERAND K. NAJARIAN
BY *Stowell & Stowell*
ATTORNEY 3,321,191
GAS AND LIQUID CONTACT APPARATUS
Herand K. Najarian, 1400 River Road,
Beaver, Pa. 15009
Continuation of application Ser. No. 122,578, July 7, 1961. This application Feb. 11, 1966, Ser. No. 538,477
4 Claims. (Cl. 261—29)

This is a continuation of application Ser. No. 122,578, filed July 7, 1961, now abandoned.

This invention relates to a novel apparatus for providing intimate contact between gases and liquid and particularly to an apparatus in which such contact is provided economically with low pressure drop and with high and continually renewed contact surface areas between the gas and liquid phases.

One aspect of the invention pertains to a novel apparatus for separating contaminants from air or other gas, wherein the gas carrying contaminants is scrubbed with a liquid scrubbing medium in the apparatus. Subsequently, a mixture of the captured contaminants and liquid scrubbing medium is withdrawn from the apparatus and relatively clean gas is discharged from the apparatus. In this aspect the invention is applicable to removal of various contaminants from air or other gases, such as, rock and mineral dusts, fly ash, acid, oil mists, dusts from mechanical grinders, lint, and the like, and comprises improvements in gas cleaning apparatus designated in the arts variously as air-washers, scrubbers, gas cleaners, and wet dust collectors.

In the apparatus of the invention, contaminants entrained in a gas are separated from the gas by impinging the gas onto mobile surfaces of a liquid scrubbing medium contained in the apparatus, whereby the contaminants separate from the gas by centrifugal force and are incorporated in the liquid scrubbing medium. Thereafter, a mixture of captured contaminants and liquid scrubbing medium is withdrawn from the apparatus and the relatively clean gas is discharged from the apparatus.

Among typical examples of many useful applications of the improved apparatus of the invention, may be mentioned:

Separating from air or other gases suspended rock dust, mineral dust, fly ash, dust from grinding operations, and the like, wherein a slurry of dusts and water withdrawn from the apparatus is allowed to settle in suitable reservoirs and clear reservoir overflow is returned to the apparatus and settled wet dust, if valuable as in the case of many mineral dusts, is recovered for reprocessing;

Separating minute liquid particles suspended in air or other gases, such as acid mists, oil mists, paint spray, and the like, and removing said mists as a suspension or solution in the liquid scrubbing medium.

The most effective means of separating suspended contaminants from a fluid mass is to subject the fluid to centrifuging action. This applies to gases as well as to liquids. The most effective way of centrifuging gases is to impinge a stream of the gas against surfaces normal or at a steep angle to the direction of the flow of the gas and, thus, obtain an abrupt turn in the direction of gas flow. Heavier particles tend to remain in the direction of flow and, thus, are thrown out of the gas stream against said surface. When the surface on which the gas is caused to impinge is a liquid surface, then these heavier particles of contaminants are forced into the body of the liquid scrubbing medium.

Secondly, the surfaces on which the gas impinges in its passage through the scrubbing apparatus should be unbroken liquid surfaces and should remain substantially unbroken in the zone of impingement. When a stream of gas flowing substantially horizontally impinges on a thin sheet of liquid scrubbing medium, falling free in the gas stream, the velocity of the stream of gas will tend to break up the thin sheet of liquid scrubbing medium into a shower of liquid droplets. There will be little, if any, change in the direction of the gas stream and, consequently, no centrifuging of the heavier contaminants suspended in the gas stream and insignificant separation of the contaminants from the gas stream. However, if the sheet of liquid scrubbing medium is made to flow over the surface of a near vertical or steep solid wall, such as a sheet of steel plate and the gas stream impinged against the sheet of flowing liquid scrubbing medium, then the impingement will cause the stream of gas to change direction abruptly causing the contaminants to be thrown against the flowing stream of liquid scrubbing medium and carried away by the liquid scrubbing medium. In the scrubbing apparatus of the invention, the gas stream carrying the suspended contaminants is caused to impinge vertically or at a steep angle initially on surface of a deep pool of the liquid scrubbing medium and, subsequently, impinged on inclined surfaces of baffled channels of novel design being washed by unbroken sheets of liquid scrubbing medium flowing continuously so that the gas stream throughout its passage through the scrubbing apparatus is subjected to repeated impingements against such sheets of liquid scrubbing medium which provide ideal impingement surfaces and which automatically wash the contaminants away from the impingement surfaces and prevent build up of accretions.

An important feature of the invention which contributes substantially to the high degree of efficiency of elimination of contaminants from a gas being processed through the apparatus of the invention is the novel method whereby the entire stream of dirty gas to be cleaned first impinges in its entirety and preferably vertically downwards onto a surface of the main body of liquid scrubbing medium held in the apparatus. Thereafter, said main gas stream is subdivided into substreams of much smaller cross-sectional area and the subdivided portions of the gas stream are passed severally upwardly through baffled inclined channels, impinging during said upward passage repeatedly onto sheets of liquid scrubbing medium covering the internal surfaces of said baffled tubes and moving concurrently with said portions of the gas stream. The contaminants thrown out of the gas stream by repeated impingement are incorporated in the liquid scrubbing medium flowing through the several baffled tubes and carried into the main body of liquid scrubbing medium.

The subdivision of the main stream of gas into many incremental streams is very important. When a stream of gas of a large cross-sectional area is caused to impinge onto the surface of a pool of liquid scrubbing medium, vertically or at a steep angle, the gas stream makes a sharp turn at the surface of the liquid. Depending partly on the velocity of impingement and cross-sectional area of the gas stream, only the largest and heaviest particles of contaminants reach the surface of the liquid scrubbing medium and are plunged into the body of the liquid. Smaller and lighter particles, because of the relatively smaller centrifugal force imposed on them and also the greater distance from interior regions of the gas stream to the surface of the liquid scrubbing medium remain in the gas stream. If the gas stream, following the initial impingement and partial cleaning, is subdivided into numerous substreams of much smaller cross-sectional areas and is repeatedly impinged on surfaces of the liquid scrubbing medium farther along with the apparatus, large proportions of the remaining smaller and lighter particles of contaminants will be recovered from the subdivided stream of gas and incorporated into the liquid scrubbing medium. The baffled inclined tubes are so designed that the number of additional impingements received by the gas as it travels through the baffled inclined tubes is determined in accordance with the amount of contaminants remaining in the gas stream after the initial impingement, thoroughness of elimination of contaminants desired, and other factors.

A further important feature of the invention is that the stream of dirty gas passing through the apparatus comes in contact only with internal surfaces of the apparatus that are continually being washed with substantially unbroken sheets of liquid scrubbing medium until clean air or gas passes through the entire impingement and cleaning zone within the apparatus. Thus, accumulations of solid contaminants on damp, inactive, and unwashed surfaces within the apparatus through contact with dirty incoming gas are avoided and the necessity for periodic cleaning of the apparatus is minimized.

One of the problems in connection with operation of all types of air and gas cleaning apparatus is the disposal of the captured contaminants. The apparatus of the invention provides the simplest of means for disposal of such contaminants. Provision is made for accumulation of the contaminants within the apparatus as a suspension or solution of the contaminants in the liquid scrubbing medium. Periodically or, if desirable, continuously, the suspension or solution of contaminants is pumped out of the apparatus. If the contaminant has economic value, then the mixture of contaminant and scrubber liquor is processed by any one of well known recovery methods for recovery of the contaminant in a form suitable for further processing or sale.

In another aspect of the invention, apparatus may be used for efficient and economical aeration of various liquids such as waste liquors from tanneries, abattoirs, paper mills, and the like, and in particular, raw sewage. The term "aeration" will be used herein to designate the process whereby components of a gas soluble in or miscible with a liquid are transferred from the gas into the body of the liquid medium and are dissolved or retained therein.

Various methods are disclosed in the prior art for "aerating" liquids with gases. A most commonly used method is to force the gas under pressure through orifices at or near the bottom of a body of liquid and let the gas bubbles go upwardly to the surface of the liquid. Since the air bubbles come in contact with the liquid only on the spherical gas-liquid interface, a relatively large volume of gas in the interior of the bubble does not come in contact with the liquid and therefore "aeration" is slow and inefficient. To increase the efficiency of the above method of aeration, mechanical diffusors or spargers are sometimes used to subdivide the larger bubbles into smaller ones. However, smaller air orifices are subject to clogging by accretions necessitating frequent stopping of operation, removing and cleaning of the orifices.

Another method used sometimes is to agitate the body of liquid at the surface to cause circulation with mechanically rotated blades. This method also is inefficient and slow due to the fact that the liquid contacts the gas on the surface with no gas velocity to cause impingement effect and also the layer of gas immediately above the liquid soon gets depleted of the component of the gas soluble or miscible with the liquid, resulting in lowering the rate of aeration.

In the present invention, thin layers of fresh undepleted gas are impinged against surfaces of liquid repeatedly as the gas and liquid pass at high velocity through many impingement zones in the apparatus, thus saturating part of the liquid continuously. Thereafter, the saturated portion of the liquid is caused to flow into the main body of liquid deficient in gas, thus agitating the body of liquid and diffusing the gas uniformly into the entire body of the liquid, as hereinafter more fully described. The principal object of this aspect of the invention is to increase the rate of aeration above usual rates of aeration obtainable by prior art methods so as to reduce the time of retention of the liquid within the apparatus for completion of chemical reactions promoted by the aeration. Another object of the invention is to minimize the maintenance of the apparatus in the initial gas-liquid contact zones normally subject to cumulative build-up of accretions and resultant clogging of gas passages by having such contact zones easily accessible without disturbing the continuity of operation of the apparatus. A further object of the invention is to provide apparatus in which the several baffled inclined channel units are interchangeable and easily removable and replaceable without interrupting the operation, thus making maintenance simple and inexpensive.

In processes designed for stabilization of various waste products dissolved or suspended in water such as raw sewage, and industrial liquid wastes, usually the first step is to aerate the liquor in order to oxidize and stabilize quickly the putrifiable odor producing organic matter in solution in the liquor. In a second step the undissolved suspended waste matter is settled as sludge and the main portion of liquor containing the stabilized waste matter in solution is allowed to overflow for disposal. The settled sludge is then processed further to oxidize and solubilize all organic matter until a residue comprising chiefly of inorganic insoluble matter is left for disposal at intervals.

The sludge comprising mainly of solid or colloidal organic waste matter is further treated to "burn" the organic compounds to make them soluble so that they can be disposed of in overflow as stable compounds. One method of treating sludge is by activation. In this method, the sludge is retained in settling basins and sometimes heated to promote activation by bacterial growth producing the needed oxygen to oxidize the organic matter.

In another method, the sludge is oxidized under high pressure and at high temperature in autoclaves for accelerated oxidation.

In another method, sludge and often raw sewage are retained for long periods, normally several months, in shallow lagoons where oxidation of organic waste matter progresses slowly through photosynthesis, algae growth and bacterial action.

Final products of above treatment methods for domestic and industrial organic wastes are free of odor producing, putrifiable compounds and the liquors are disposed of without producing nuisance.

The apparatus of the invention may be used not only in preliminary aeration of waste liquors to oxidize the waste matter in solution, but by returning the settled sludge to mix with raw liquor feed preferably at intervals, complete stabilization can be achieved in simple inexpensive apparatus.

The invention will be more particularly described with reference to the accompanying drawings in which:

FIG. 6 is a transverse vertical section on line 6—6 of FIG. 4;

Figure 1:
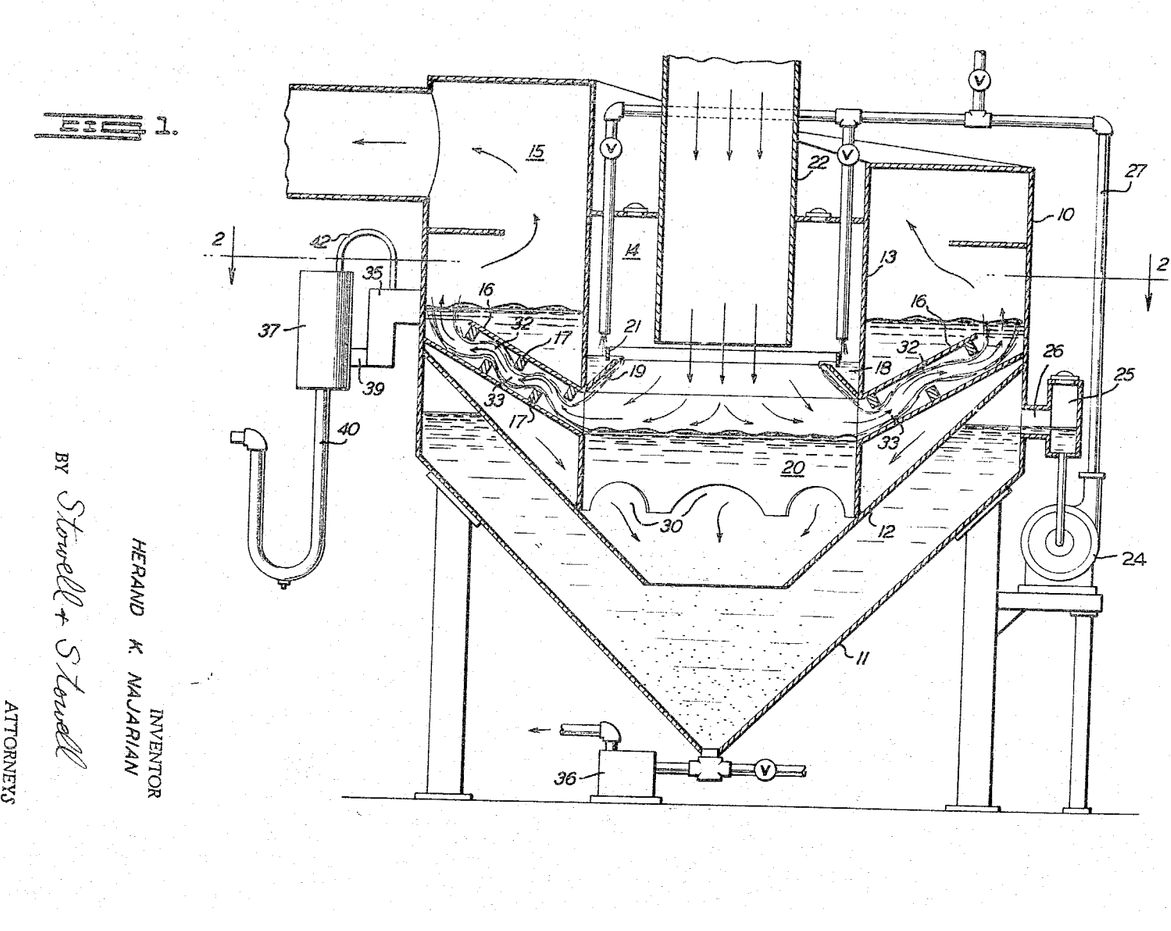
FIG. 1 is a diametrical vertical section through a cylindrical gas scrubber embodying the principles of the invention.
Figures 2, 3:
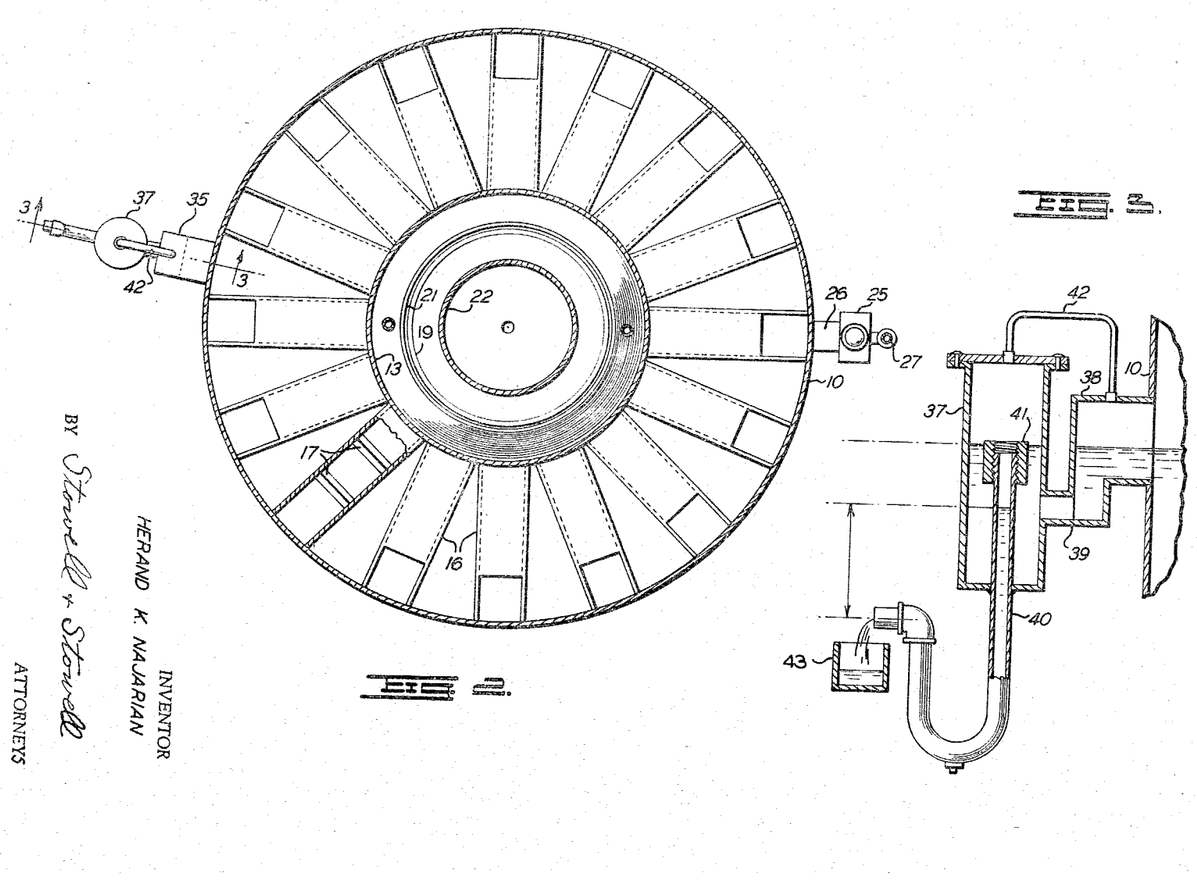
FIG. 2 is a horizontal section on line 2—2 of FIG. 1.
FIG. 3 is a detail in partial section on line 3—3 of FIG. 2, showing the constant level overflow arrangement.

In FIGS. 1–3 of the drawings, 10 is a cylindrical tank, preferably of steel, having a conical bottom sump section 11. 12 is a truncated concentrically positioned cone within tank 10, spaced above the bottom cone of the tank, and having an opening at the bottom into sump of tank 10. Within the upper part of tank 10 and projecting upwardly from the lower part of the inner cone 12, is a cylindrical wall 13 dividing the space within the main tank into an inner gas inlet chamber 14, and an annular gas exhaust chamber 15. From the periphery of inner cylindrical wall 13, and spaced above the bottom thereof, baffled channels 16 project radially into the outer annular gas outlet chamber 15. Baffled tubes 16 are inclined upwardly from the gas inlet chamber 14 into gas outlet chamber 15, preferably at a 20°–30° angle from the horizontal. Baffles 17 project from floor and roof of the inclined tubes 16. The number of baffles 17, the distances between baffles and the height thereof are selected to meet the requirements of nature of the gas to be cleaned, the contaminants found in the gas, the concentration of said contaminants in the gas and other factors. The length of the inclined baffled tubes likewise is varied in accordance with burden imposed by various gases, such as, loading of contaminant, wetting qualities of solid dust or fume contained in gas. Easily wet fumes and dust and smaller percentages of contaminants require shorter tubes than fumes and dust difficult to wet and when the gas is heavily loaded. Directly above the lower openings of radially disposed baffled inclined tubes 16 is a trough 18 adapted to receive and hold quantity of liquid scrubbing medium. Annular trough 18 is formed by the wall of cylindrical wall 13 and an inclined member 19 projecting from directly above the top of the lower end of the inclined baffled tubes into the gas inlet chamber 14. Liquid scrubbing medium from trough 18 overflows over the upper edge of inclined member 19 into the main body of liquid scrubbing medium 20 held in the lower portion of main tank 10. A baffle 21 serves to equalize overflow of liquid scrubbing medium over the edge of trough member 19. The bottom portion of annular gas exhaust chamber 15 communicates with conical bottom of main tank 10 below the level of body of liquid scrubbing medium 20 through openings 30 at bottom of wall 13. Air or other gas containing contaminants enters the gas inlet chamber 14 through vertically disposed duct 22 and impinges initially onto the main body of liquid scrubbing medium 20 and mushrooms out in all directions as indicated by arrows and thereafter the stream of gas is subdivided into substreams as the gas passes upwardly through the baffled inclined tubes 16 into the gas exhaust chamber 15 above the upper body of liquid scrubbing medium. As the stream of gas mushrooms out towards the lower inlet openings of the baffled inclined tubes the velocity of the gas pushes the sheet of liquid scrubbing medium overflowing the trough 18 onto the undersurface of inclined trough member 19, and into the baffled inclined tubes, where the sheet of liquid scrubbing medium is transported upward along the roof of said tubes and over the baffles therein by the stream of gas and as it is propelled by the gas stream along the tortuous path shown by arrows within the inclined channels, the liquid forms concave surfaces 32 between the baffles against which concave surfaces of liquid scrubbing medium stream of gas impinges, the number of impingements depending on number of baffles. Furthermore, a continuous sheet of liquid scrubbing medium comprising portions of the main body of liquid scrubbing medium 20 is propelled upwardly along the floor of said baffled inclined tubes by said upward passage of the stream of gas. The stream of liquid scrubbing medium, as it passes over the transverse baffles along the bottom of inclined tubes and deviated by gas stream, forms concave surfaces 33 onto which gas stream impinges alternate to concave surfaces 32 along the roof of inclined tubes.

As the subdivided streams of gas travel upwardly through baffled inclined tubes 16 along the tortuous path shown by arrows, the change of direction forced on the stream of gas by transverse baffles 17, causes the stream of gas to impinge alternately on curved surfaces 32 and 33 of the sheets of liquid scrubbing medium. With each impingement additional contaminants are separated from the gas stream by centrifugal action and the contaminants are carried off by the liquid scrubbing medium passing upwardly through the tubes, which is discharged from the upper end of the tubes into the body of scrubbing liquid in the annular discharge chamber. As long as the apparatus is in operation, liquid scrubbing medium flowing into the upper body of liquid scrubbing medium returns downwardly through wedge-shaped openings between tubes, along the bottom of upper cone 12 as shown by arrows and through openings 30 at bottom of circular partition 13 down into the lower cone. Here the contaminants congregate as a mixture or slurry of the contaminants with liquid scrubbing medium, and may be withdrawn, as for instance, by a common slurry pump 36 and transported to settling pond for recovery of contaminant if said contaminant is valuable. Otherwise, it may be pumped to a disposal area. The main part of the liquid scrubbing medium returning from exhaust chamber 15 to lower settling cone 11, after the contaminants have separated by settling, becomes relatively free of contaminants, a portion of the clear liquid scrubbing medium rises to the surface of main body of liquid scrubbing medium 20 and the remainder overflows through overflow openings 26 into launder 25 and from there pumped, by pump 24, through pipes 27 into trough 18 in gas entrance chamber 14.

Referring particularly to FIG. 3, a cylindrical vessel 37 is connected to annular exhaust chamber at the level of the liquid scrubbing medium through box 38 and passage 39. A small diameter pipe 40 projects upwardly to a small distance below the level of liquid scrubbing medium and is provided with an adjustable coupling 41 at upper end. Pipe 40 projects downwardly and is provided with an inverted syphon to permit retention of a body of liquid as a seal against suction in exhaust chamber 15, a small diameter vent 42 equalizes pressure in 37 and exhaust chamber 15. When the level in 15 rises due to excess make-up liquid, the liquid overflows coupling 41 and passes through pipe 40 into waste launder 43.

In operation the sump is initially filled with liquid wash medium to a level at which the lower ends of the inclined baffled passages 16 are wholly or nearly submerged. The gas flow and the wash liquid pump may be started simultaneously or in succession. Typically, the flow of the gas and liquid wash medium upwardly through the inclined passages requires a pressure differential between the gas inlet chamber and the gas outlet chamber of from four to eight inches of water. During operation, because of the pressure differential between the inlet and outlet chambers caused for example by a conventional air compressor as shown at 60 in FIGURE 5, the level of liquid in the outlet chamber stands higher than the level in the inlet chamber, as indicated in FIG. 1 of the drawing, and as liquid wash medium is carried from the sump into the outlet chamber through the outlet passages, an equivalent amount of liquid wash medium laden with contaminants flows downward from the outlet chamber between the passages into the lower portion of the sump.

Figure 4:
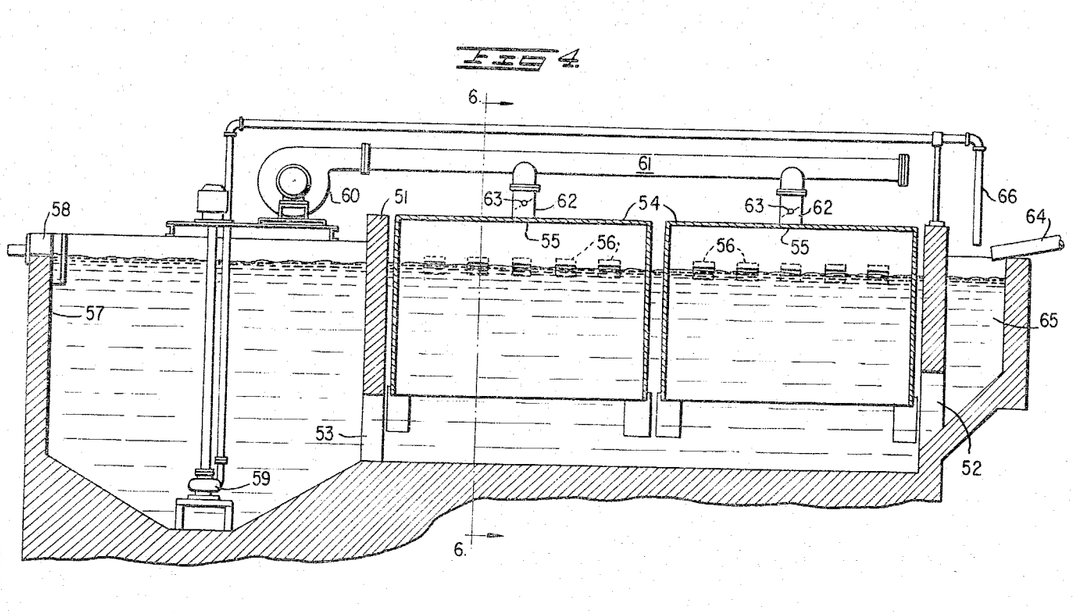
FIG. 4 is a longitudinal vertical section of an aerator embodying the principles of the invention.
Figure 5:
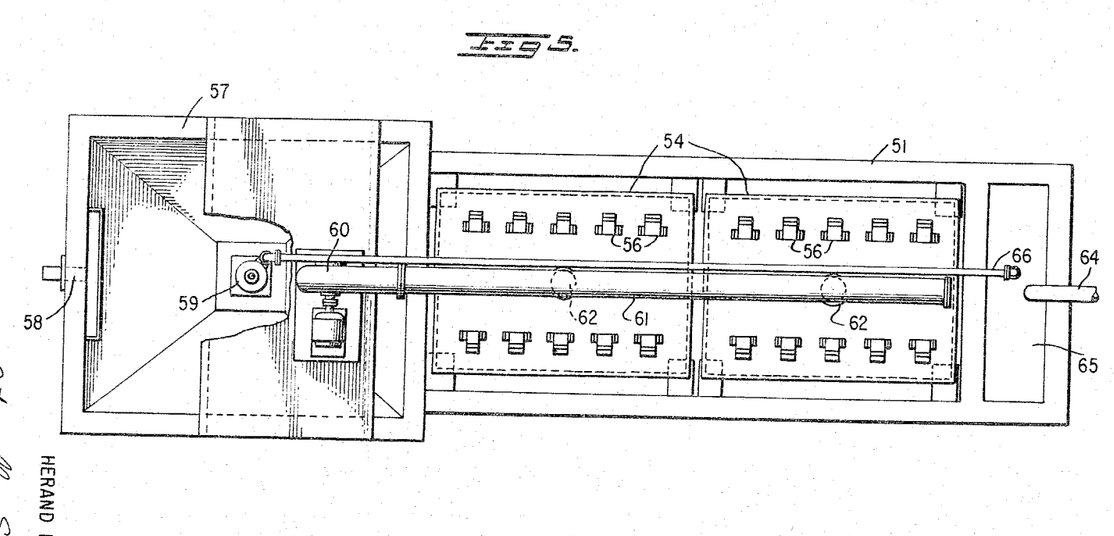
FIG. 5 is a plan view of the aerator of FIG. 4.

The aerator of FIGS. 4–6 comprises a vessel 51 in its preferred form a long relatively narrow trough made of steel or concrete and adapted to hold body of liquid and having an opening 52 at one end for admission of raw sewage or industrial waste liquor and a second opening 53 for discharge of aerated sewage or liquor, one or more gas inlet chambers 54 within vessel 51 spaced from walls and bottoms thereof to allow free circulation of liquid and having gas inlet openings 55 to supply gas under pressure to said chambers and baffled gas outlet passages 56 inclined upwardly from the gas inlet chamber to vessel 51.

Except for small capacity installations, it is preferable to have a number of gas inlet chambers 54 positioned equidistant within the vessel 51 to permit regulation and equalization of air pressure within the several gas inlet chambers, the number of the chambers depending on the total length of the aerator and aerating capacity desired.

Since aeration proper constitutes normally the initial step in processes for complete stabilization of raw sewage and industrial waste liquors, it is desirable to provide a settling basin 57 as auxiliary to the aerator, so that the aerated product is allowed to run into the settling basin having an overflow 58 common to both aerator and the settling basin to permit regulation of the liquid level in the aerator as well as the settling basin. Aerated sewage or liquor is allowed to pass through discharge opening 53 of the aerator into the lower part of the settling basin 57 and the level of liquid in settler as well as aerator vessel 1 is maintained by regulating overflow opening 58. The sludge accumulating in the lower portion of settling basin 57 may be removed by pump means 59 and processed further in accordance with various methods referred to above or it may be transferred and mixed with incoming raw sewage or waste liquor for repeated treatment in the aerator.

An air compressor 60 is provided to furnish gas under pressure to the several gas inlet chambers through gas header 61, and header branches 62, the amount of gas being regulatable by dampers 63. Raw sewage or liquors enter the aerator through supply pipe 64 and feed compartment 65 and return sludge is transported through pipe 66.

Figure 8:
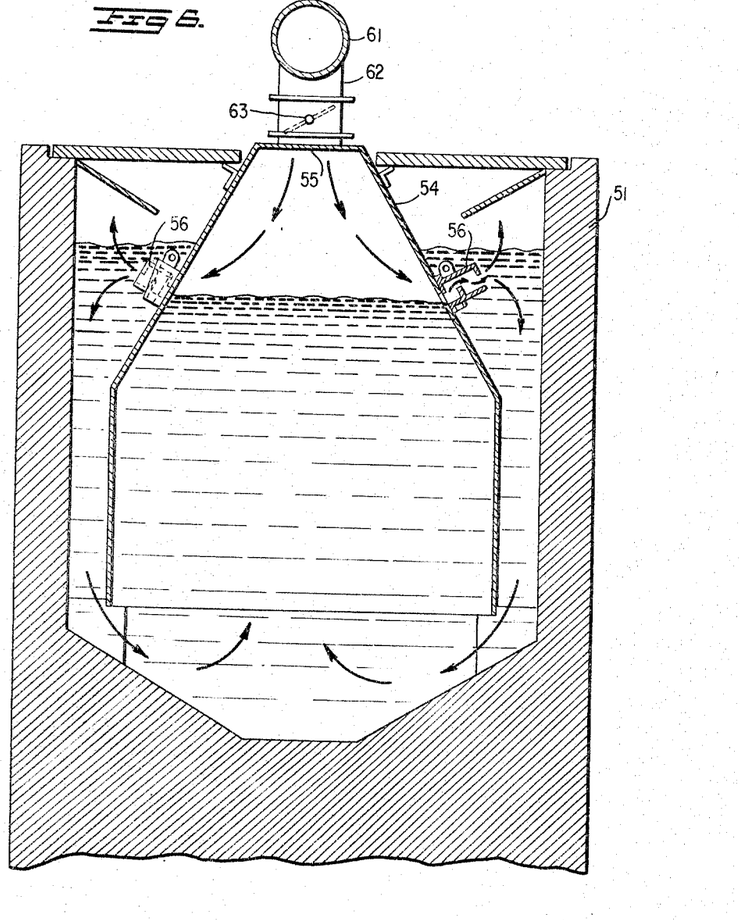
FIG. 8 is an enlarged sectional view of the removable and interchangeable baffled inclined channel member of the invention as mounted in the aerator of FIGS. 4–7.
Figure 9:
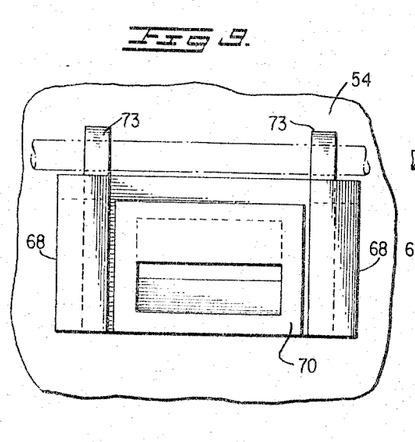
FIG. 9 is a view of the channel member of FIG. 8 showing the outlet end thereof.
Figure 10:
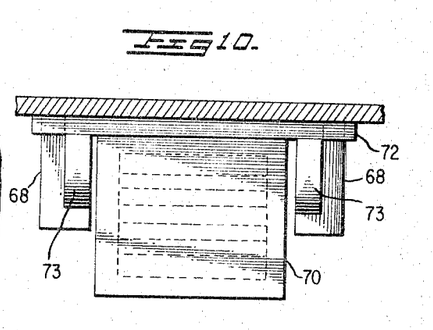
FIG. 10 is a top view of the channel member of FIG. 8.

The baffled inclined channels 56 projecting upwardly from the gas inlet chamber 54 into the outer vessel 51 are removable and interchangeable so that they can be easily removed during operation for inspection or cleaning if necessary. Furthermore, when a channel unit with, for example, small number of baffles does not prove adequate, others with a larger number of baffles or larger openings and different baffle heights may be substituted without disturbing the operation of the aerator. One form of removable baffled inclined channel is shown in FIGS. 8–10 wherein gas inlet chamber 54 has an opening 67 into outside vessel 51 and brackets 68 permanently attached to the outside wall of the gas inlet chamber adjacent opening 67. The removable baffled channel unit comprises an outside shell 70, projecting baffles 71 inside said shell and a flange 72 at one end whereby the channel unit may be locked in place against the wall of the gas inlet chamber 51 by means of wedges 73 having holes at the upper end to permit easy removal and replacement.

Figure 7:
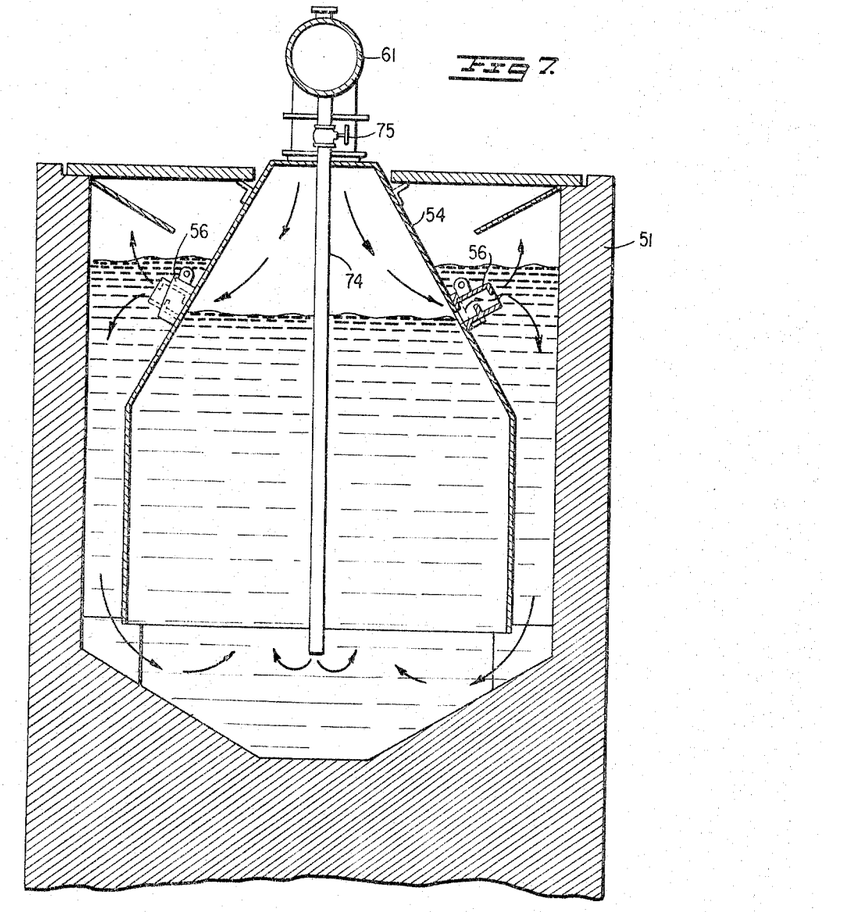
FIG. 7 is a transverse vertical section of a modified form of the aerator of FIG. 4.

A modification of the gas supply to the aerator is shown in FIG. 7 in which identical elements are numbered as in FIGS. 4–6. When sewage and industrial waste liquors contain large proportions of solid material in suspension which may settle to the bottom of aerator, it may become necessary to agitate the bottom region of the aerator vessel 51 more vigorously than is provided by the circulation induced by liquid propelled from the gas inlet chamber to the outside vessel in order to keep the solid and colloidal matter from settling and accumulating in the aerator. Therefore, air pipes 74 are provided projecting downwardly from air header 61 into the gas inlet chambers and having an opening at end thereof below the surface of the liquid, preferably near the bottom of vessel 51. Valves 75 regulate the air flow through above pipes 74. Air discharged from bottom of pipes 74 bubbles through the liquid up to upper portion of gas inlet chamber 54 and passes through the inclined baffled passages as in the apparatus of FIGS. 4–6 agitating the bottom of the trough.

Operation of the aerator form of the apparatus of the invention is as follows:

The liquid holding tank 51 of the aerator is filled with the liquid to be aerated to a level determined by the elevation of the lower openings of the baffled inclined passages 56. The lower openings of these passages should be completely submerged when the liquid is at rest. When gas compressor 60 is started and pressure builds up in the several gas inlet chambers the level of liquid in gas inlet chamber will go down until the lower ends of the inclined passages are exposed and gas starts passing up the inclined passages. The quantity of gas supplied each unit of gas inlet chamber is regulated by dampers 63 so as to maintain a high velocity of gas flow through the inclined passages, normally 2000–4000 feet per minute, to cause strong impingement of gas on liquid and force the gas into the liquid against the surface tension of the liquid and also to have driving power to transport a quantity of liquid upwardly into the upper portion of the liquid body at the outer region of the holding tank. Thus, the liquid is saturated by gas during passage through inclined channels and saturated liquid collects in the upper portion of the holding tank and then flows under the head created by the transport of liquid through the inclined channels towards the bottom of the holding tank, diffusing the gas into the gas-depleted portion of the liquid and in addition inducing a circulation of the entire mass of liquid crosswise of the liquid holding tank as the mass of liquid slowly moves lengthwise from the feed end to the discharge end of the aerator. The gas diffused into the body of liquid at lower portion of the holding tank is consumed in the chemical reactions occurring as part of the aeration process and the gas depleted liquid is again passed through the baffled inclined passages to start another cycle of saturation and diffusion. As gas and liquid are ejected from the upper opening of the baffled inclined passages, the liquid turns downward and the gas passes out of the liquid as shown by the arrows in FIG. 6. The crosswise circulation within the body of liquid in the holding tank serves to aerate uniformly the entire body of liquid and keeps it aerated until it is discharged from the aerator. The concentration of organic waste matter in the waste liquor or sewage and its susceptibility to chemical change by aeration determine the retention time of the liquid in the aerator and is usually resolved by testing.

When conditions require, the aerator apparatus may be operated by suction applied over the liquid in the holding tank, using the gas inlet openings in the gas inlet chamber for admission of gas into the apparatus.

It will be seen that in its various aspects the apparatus of the invention generally comprises a liquid holding vessel having suitable liquid supply and outlet means, an inverted open-bottomed gas chamber in the upper portion of the liquid holding vessel, the walls of the gas chamber being spaced at least in part from the walls of the liquid holding vessel to provide passage for liquid therebetween, means providing baffled passages inclined upwardly from the upper portion of the gas chamber into the upper portion of the liquid holding vessel, and means for supplying a gas to the gas chamber under a pressure greater than the pressure in the upper portion of the liquid holding vessel. The details of form and arrangement shown in the drawings are merely illustrative of the principles of the invention and variations embodying these principles within the scope of the claims will be obvious from the foregoing description of the principles and illustrative embodiments of the invention.

What is claimed is:

1. A gas scrubber comprising a casing having a gas inlet and a gas outlet in the upper portion thereof and providing a liquid-holding sump in the bottom portion thereof, partition means dividing the upper portion of the casing into an inlet chamber including the gas inlet and an outlet chamber including the gas outlet and extending downward into the sump and spaced apart from the bottom thereof, a plurality of passages through said partition means inclined upwardly from said gas inlet chamber into the gas outlet chamber, a plurality of baffles in each of said passages to thereby define hurdles for gas and liquid flowing therethrough, said baffles extending inwardly of said passages and positioned crosswise of the flow path through said passages, a body of liquid wash medium in said sump, gas propelling means for maintaining pressure differential between said gas inlet and gas outlet chambers to cause the level of said sump liquid in the gas outlet chamber to stay a distance above the baffled, inclined passages and simultaneously to keep the level of the sump liquid at the bottom of the gas inlet chamber below the gas passages from the gas inlet chamber into the lower ends of said inclined, baffled passages, means for supplying liquid wash meduim to said sump, and liquid overflow means to maintain said level of sump liquid in the gas outlet chamber, the liquid in said outlet chamber including liquid carried from said sump up through said baffled passages.

2. The scrubber of claim 1, wherein the outlet ends of said plurality of baffled passages are angularly separated to thereby define gaps therebetween, means communicating said gaps with the liquid in the sump, whereby liquid carried upwardly in said plurality of baffled passages spills over into said gaps and down into said sump.

3. Gas and liquid contact apparatus comprising a liquid-holding vessel, a gas inlet, a gas outlet, means providing an inverted open-bottomed gas chamber in the upper portion of said vessel, the walls of said gas chamber being spaced at least in part from the walls of the vessel to provide passage for liquid therebetween, means providing passages inclined upwardly from the upper portion of the gas chamber into the upper portion of the vessel, a plurality of baffles in each of said passages to thereby define hurdles for gas and liquid flowing therethrough, said baffles extending inwardly of said passages and positioned crosswise of the flow path through said passages, means for maintaining a pressure differential between said gas inlet and gas outlet to cause the level of a liquid in the liquid holding vessel to stay a distance above the baffled, inclined passages, means for supplying liquid to said vessel and means for supplying a gas under pressure to the top portion of the gas chamber including means for supplying gas to the gas chamber below the surface of the liquid therein.

4. Gas and liquid contact apparatus comprising a liquid-holding vessel, means providing an inverted, open-bottomed gas chamber in the upper portion of said vessel, the walls of said gas chamber being spaced at least in part from the walls of the vessel to provide a continuous passage for liquid therebetween, a plurality of baffled passages inclined upwardly from the upper portion of the gas chamber into the upper portion of the vessel, each of said passages including a plurality of baffles therein to thereby define hurdles for gas and liquid flowing therethrough, said baffles extending inwardly of said passages and positioned crosswise of the flow path through said passages, said plurality of baffled passages being angularly separated from each other to thereby define gaps therebetween, means communicating said gaps with the lower portion of said liquid-holding vessel, whereby liquid carried upwardly in said plurality of baffled passages may spill down into the bottom portion of said liquid-holding vessel.

References Cited by the Examiner

UNITED STATES PATENTS

| 2,360,229 | 10/1944 | Holmes | 261—121 |
| 2,585,659 | 2/1952 | Kilpatrick | 55—85 X |
| 2,883,170 | 4/1959 | Trittipoe | 261—112 |

FOREIGN PATENTS 504,843  12/1954  Italy.

HARRY B. THORNTON, *Primary Examiner.*
RONALD R. WEAVER, *Examiner.*